(12) United States Patent
Niigaki et al.

(10) Patent No.: US 8,149,567 B2
(45) Date of Patent: Apr. 3, 2012

(54) CAPACITOR MODULE

(75) Inventors: Yoshitaka Niigaki, Hiratsuka (JP); Hikosaburou Hiraki, Hiratsuka (JP); Satoru Nishimuru, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 581 days.

(21) Appl. No.: 12/226,617

(22) PCT Filed: Apr. 27, 2007

(86) PCT No.: PCT/JP2007/059248
§ 371 (c)(1),
(2), (4) Date: Oct. 23, 2008

(87) PCT Pub. No.: WO2007/126082
PCT Pub. Date: Nov. 8, 2007

(65) Prior Publication Data
US 2010/0060243 A1    Mar. 11, 2010

(30) Foreign Application Priority Data
Apr. 27, 2006 (JP) ................. 2006-123765

(51) Int. Cl.
*H01G 4/00* (2006.01)

(52) U.S. Cl. .......... 361/328; 361/301.1; 361/274.2; 361/289; 361/283.1; 361/299.1

(58) Field of Classification Search ........ 361/274.2, 361/274.3, 280, 299.3, 299.1, 289, 283.1, 361/301.1
See application file for complete search history.

(56) References Cited

U.S. PATENT DOCUMENTS

| 1,898,789 | A | 2/1933 | Ringwald |
| 1,908,962 | A | 5/1933 | Danziger |
| 3,648,337 | A | 3/1972 | Greskamp et al. |
| 3,670,210 | A | 6/1972 | Blase |
| 6,021,040 | A | 2/2000 | Suzuki et al. |
| 6,031,751 | A | 2/2000 | Janko |

(Continued)

FOREIGN PATENT DOCUMENTS

DE    19851870 A1    5/2000

(Continued)

OTHER PUBLICATIONS

German Office Action dated Dec. 1, 2009 issued in German Patent Application No. 11 2007 000 991.8-34.

(Continued)

*Primary Examiner* — Nguyen Ha
*Assistant Examiner* — Hung Dang
(74) *Attorney, Agent, or Firm* — Edwards Wildman Palmer LLP

(57) ABSTRACT

The capacitor module includes a capacitor, in which a screw hole is arranged on an outer bottom wall surface of a capacitor case housing a capacitor element, and a heat dissipater, on which a plurality of capacitor cases are fixated by screwing fixation screws in the screw holes of the capacitors. As a result, for example, the capacitor can be fixated with reliability and durability secured even under a condition where very strong vibration is continuously applied, for example, when the capacitor module is mounted on construction machinery. Further, because, an adherence of the outer bottom wall surface of the capacitor case on a fixation surface of the heat dissipater is strengthened by screwing the fixation screw in the screw hole, the capacitor can be cooled down by transferring heat produced by the capacitor to the heat dissipater as needed.

10 Claims, 15 Drawing Sheets

U.S. PATENT DOCUMENTS

| | | | |
|---|---|---|---|
| 6,399,237 B1 | 6/2002 | Souliac et al. | |
| 7,016,177 B1 | 3/2006 | Thrap | |
| 7,203,056 B2 * | 4/2007 | Thrap | 361/502 |
| 2002/0182480 A1 | 12/2002 | Hanauer et al. | |
| 2003/0117765 A1 | 6/2003 | Sagal | |
| 2004/0174649 A1 * | 9/2004 | Ito | 361/91.1 |
| 2005/0041370 A1 | 2/2005 | Wilk et al. | |
| 2007/0259263 A1 | 11/2007 | Shibuya et al. | |

FOREIGN PATENT DOCUMENTS

| | | |
|---|---|---|
| DE | 199 13 450 A1 | 9/2000 |
| EP | 0732711 A1 | 9/1996 |
| EP | 1067610 A1 | 1/2001 |
| FR | 2 863 400 A1 | 6/2005 |
| GB | 2154062 A * | 8/1985 |
| JP | 10-106902 | 4/1998 |
| JP | 11-274001 | 10/1999 |
| JP | 2002-252151 | 9/2002 |
| JP | 2005-026219 | 1/2005 |
| WO | WO-2006/041034 | 4/2006 |

OTHER PUBLICATIONS

Examination Report dated Apr. 1, 2011, issued for the corresponding U.K. patent application No. 0818772.6.

Decision of a Patent Grant for Japanese Patent Application No. 2008-513309 issued Sep. 8, 2011.

International Search Report, Jul. 24, 2007, issued in PCT/JP2007/059248.

* cited by examiner

CAPACITOR MODULE

TECHNICAL FIELD

The present invention relates to a capacitor module in which a plurality of capacitors is connected.

BACKGROUND ART

Conventionally, there has been a capacitor made by inserting a capacitor element into a metal case. The metal case is cylinder-shaped, closed at one end, and open at another end. After the capacitor element is inserted into the metal case, the opening at another end is blocked by a terminal block. The terminal block, which has an external terminal connected with an internal terminal of the capacitor element, is fixed on the opening edge of the metal case (see Patent Document 1, for example).

On the other hand, a conventional heat dissipation structure of a capacitor module in which plural capacitors are connected is a heat sink to which a plurality of assembled batteries is connected via a thermal conductive member, and cooling liquid flows through internal space of the heat sink (see Patent Document 2, for example).

Patent Document 1: Japanese Patent Application Laid-Open No. 2002-252151

Patent Document 2: Japanese Patent Application Laid-Open No. 2005-26219

DISCLOSURE OF INVENTION

Problem to be Solved by the Invention

In order to constitute a capacitor module by connecting plural capacitors with each other, each capacitor needs to be fixed on an underlying module case. The capacitor, however, does not have a component for fixation. Thus conventionally, as a way to fixate a capacitor, the capacitor can be mounted on a bottom plate of the module case, a holding clamp is attached to an opening edge of a metal case of each capacitor, and capacitors are retained between the holding clamp and the module case.

The way of fixation by which the capacitor is retained between the holding clamp and the module case, however, is not favorable when vibration is continuously applied, from the viewpoint of reliability and durability. Especially, when such a capacitor module is used under and condition where very strong vibration is continuously applied, for example, on construction machinery, the above mentioned problem becomes even more critical and capacitor may be dropped out of the module case when the holding clamp is moved over.

Further, for example, when the capacitor module is applied to the construction machinery, driving and deceleration are frequently performed on a time scale of a few seconds to ten and several seconds, and consequently the capacitor needs to be used under a frequent charge/discharge cycle. Thus, load variation becomes greater, which increases an amount of heat generated by the capacitor. Therefore, there has been a demand for a heat dissipation structure that maintains internal temperature of the capacitor below an allowable temperature limit (e.g., 60° C.) even under a frequent charge/discharge cycle, in order to prevent damage on life of the capacitor.

Further, if an application of a capacitor module to construction machinery changes a physical appearance of the machinery, production cost of the machinery increases, which is not favorable. Thus, a downsizing of a capacitor module is required for space saving. A reduced capacity of the capacitor, however, increases a heating value because of an internal loss of capacitor elements, and therefore a suitable heat dissipation structure is longed for in this point as well.

The present invention is made in view of the above, and an object of the present invention is to provide a capacitor module that can fixate a capacitor with reliability and durability secured even under a condition where vibration is applied, and can provide a heat dissipation structure suitably adapted to an increase of internal temperature of the capacitor.

Means for Solving Problem

According to an aspect of the present invention, a capacitor module according to the present invention includes plural capacitors each including a capacitor case which houses a capacitor element. The capacitor case includes an outer bottom wall part thicker than other walls and a screw hole formed in the outer bottom wall part, and a heat dissipater to which each of the capacitors is fixated with a fixation screw screwed into the screw hole.

In the capacitor module according to the present invention, the heat dissipater may include in a cross section a cooling path through which cooling medium flows.

In the capacitor module according to the present invention, the heat dissipater may be made of metallic material, and a sheet member, which is made of insulating material, may be interposed between an outer wall surface of the capacitor and the heat dissipater.

In the capacitor module according to the present invention, an interposed member made of insulating material may be interposed between the fixation screw and the heat dissipater.

In the capacitor module according to the present invention, the capacitor may be covered by a cover.

In the capacitor module according to the present invention, the capacitor and the fixation screw may be covered by a cover.

In the capacitor module according to the present invention, the cover may be made of metallic material.

In the capacitor module according to the present invention, a sheet member made of insulating material may be interposed between the cover and a connection clamp that electrically connects the plural capacitors together.

the capacitor module according to the present invention, may further include a temperature sensor arranged inside the cover to detect temperature of the capacitor, and a controller attached outside the cover to perform a charge/discharge control of each of the capacitors according to temperature detected by the temperature sensor.

In the capacitor module according to the present invention, the temperature sensor may be arranged on a connection clamp that electrically connects the capacitors together.

the capacitor module according to the present invention, may further include a booster that boosts output voltage of the capacitor.

the capacitor module according to the present invention, may further include a leg made of vibration-proof rubber and attached to the heat dissipater.

Effect of the Invention

The capacitor module according to the present invention includes the plural capacitors each including the capacitor case which houses the capacitor element. The capacitor case has the outer bottom wall part thicker than other walls and the screw hole formed in the outer bottom wall part. The capacitor is fixated to the heat dissipater with the fixation screw screwed into the screw hole. As a result, even when the capacitor module is used under a condition where very strong vibration is continuously applied, for example, when the capacitor module is mounted on construction machinery, the capacitor can be fixated with reliability and durability secured. Further, because an adherence of the outer wall surface of the capacitor case to the fixation surface of the heat dissipater is strengthened by screwing the fixation screws in the screw hole, heat of the capacitors can be dissipated by transferring heat produced by the capacitors to the heat dissipater as needed. Thus, a heat dissipation structure suitably adapted to an increase of internal temperature of the capacitor can be obtained.

Further, the heat dissipater includes in cross section a cooling path through which cooling medium flows. As a result, cooling medium can further dissipate heat of the capacitor. Thus, a heat dissipation structure more suitably adapted to an increase of internal temperature of the capacitor can be obtained.

Further, the heat dissipater is made of metallic material, and the sheet member made of insulating material is interposed between the outer wall surface of the capacitor and the heat dissipater, whereby electrical insulation of the capacitor can be enhanced with the above heat dissipation structure maintained.

Further, the interposed member made of insulating material is interposed between the fixation screw and the heat dissipater, whereby electrical insulation of the capacitor can be enhanced with the above heat dissipation structure maintained.

Further, the fixation screw is made of insulating material, whereby electrical insulation of the capacitor can be enhanced with the above heat dissipation structure maintained.

Further, the capacitor and the fixation screw are covered by the cover, whereby a drip-proof structure and a dust-proof structure for the capacitor can be obtained.

Further, the cover is made of metallic material, and heat produced by the capacitor is dissipated via the cover, whereby the heat dissipation performance of the capacitor can be enhanced.

Further, the sheet member made of insulating material is interposed between the cover and the connection clamp that electrically connects the plural capacitors together, and the heat produced by the capacitor is dissipated from the connection clamp via the cover, whereby the heat dissipation performance of the capacitor can be enhanced.

Further, the temperature sensor that detects temperature of the capacitor is arranged inside the cover, and the controller that performs a charge/discharge control of each capacitor according to the temperature detected by the temperature sensor is attached outside the cover, so that a control of the capacitor can be performed according to heat generation, whereby safety of the capacitor module can be enhanced. Further, because the controller that performs a control of the capacitor is arranged outside the cover, the capacitor module that includes the controller can be realized. Specifically, for example, the capacitor module can be mounted on construction machinery and the like together with the controller.

Further, because temperature of the connection clamp part is approximately equal to temperature of the inside of the capacitor, an ideal control can be realized by attaching the temperature sensor to the connection clamp. Thus, it is not necessary to incorporate the temperature sensor in the capacitor.

Further, the booster that boosts output voltage of the capacitor is provided, whereby capacity, quantity, charge/discharge voltage of the capacitor can be decreased and the space-saving, low-cost capacitor module can be realized.

Further, because the leg made of vibration-proof rubber is attached to the heat dissipater, a vibration-proof structure can be realized, whereby the capacitor module can be fixated with reliability and durability secured even when the capacitor module is used under a condition where very strong vibration is continuously applied, for example, when the capacitor module is mounted on construction machinery, which is an attached part.

Figure 1:
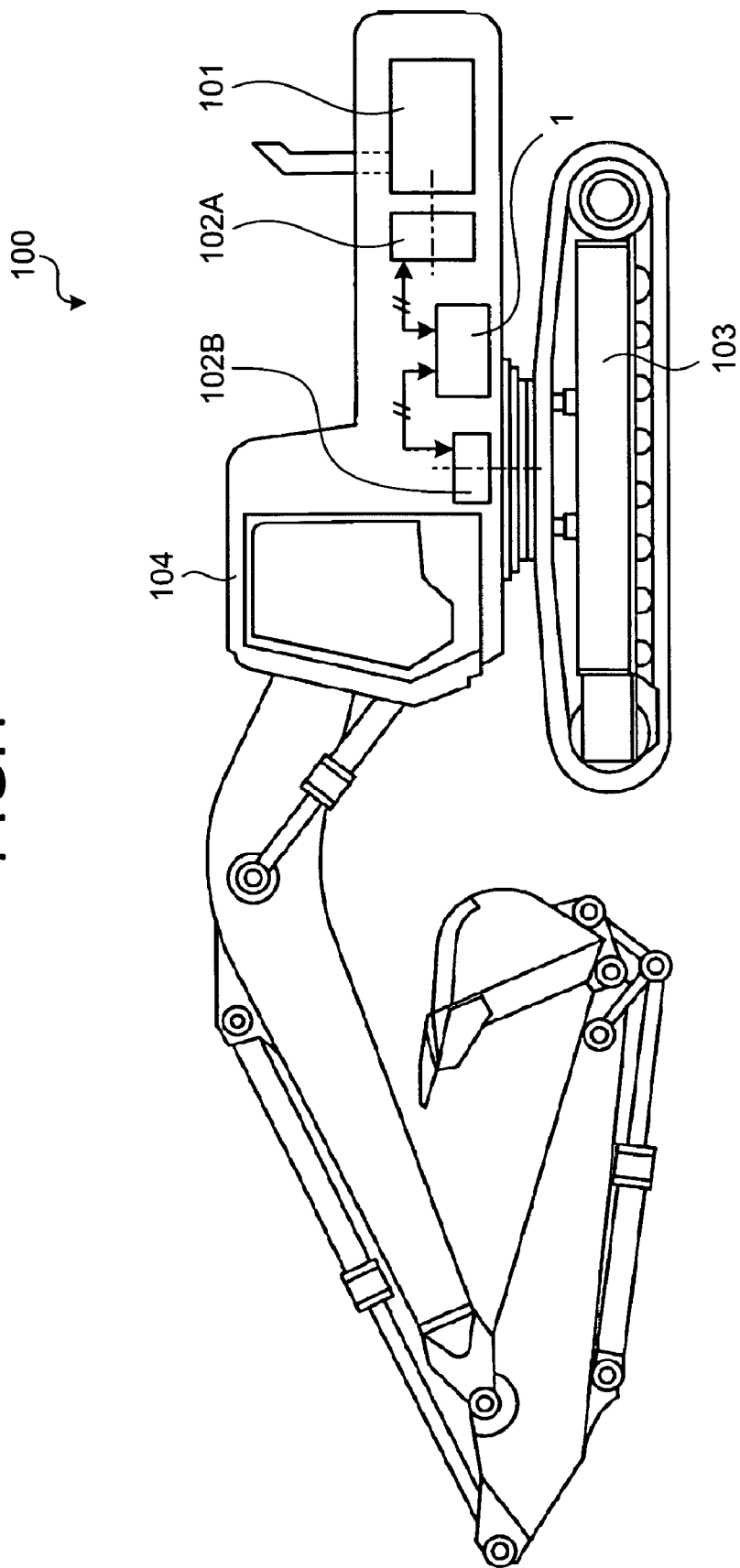
FIG. 1 is a schematic diagram of an example of construction machinery to which the present invention is applied.

EXPLANATIONS OF LETTERS OR NUMERALS 1, 15 Capacitor module
2, 11, 12, 13, 14 Capacitor
3 Heat dissipater
4 Fixation screw
9 Temperature sensor
10 Leg
21 Capacitor element
22, 24, 25, 26, 27 Capacitor case
23 Terminal block
31 Fixation surface
32 Through hole
33 Cooling passage
41 Sheet member
42 Interposed member
51 Connection clamp
52 Balance circuit
53 Sheet member
61 Upper cover
62 Bottom cover
71 Controller
72 Electrical wiring
73 Connector
81 Pump
82 Cooler 83 Cooling pipe
100 Hydraulic shovel
101 Engine
102A Assist motor
102B Swing motor
103 Automotive part
104 Swing part
201 Outer mold
202 Inner mold
211 Internal terminal
221, 241, 251, 261, 271 Bottom wall part
222, 242, 252, 262, 272 Screw hole
231 External terminal
243 Convex part
253 Engaging part
331 Water entrance
332 Water exit
2011 Cavity
2012 First projection
2013 Second projection
2021 Pillar part
H1 Space
H2 Distance
M Soft Metal
O Center

BEST MODE(S) FOR CARRYING OUT THE INVENTION

Exemplary embodiments of the present invention are described in detail below with reference to accompanying drawings. The present invention, however, is not limited to the embodiments.

FIG. 1 is a schematic diagram of an example of construction machinery to which the present invention is applied. Here, a hydraulic shovel 100 is given as an example of the construction machinery. The hydraulic shovel 100 uses, in addition to an engine 101, motors 102A and 102B, as a drive system. Specifically, the hydraulic shovel 100 uses an assist motor 102A and a swing motor 102B as shown in FIG. 1. The assist motor 102A is directly connected to an output shaft of the engine 101, and assists the engine 101 to improve responsiveness to an operation by an operator in an immediate work operation when a rotation number of the engine 101 is made low to reduce fuel consumption. The swing motor 102B is arranged in a swing part 104 arranged rotatably around a swing shaft, which is substantially vertical to an automotive part 103, and the swing motor 102B serves to swing the swing part 104. Further, a capacitor module 1 according to the present invention is connected to the assist motor 102A and the swing motor 102B. The capacitor module 1 provides the assist motor 102A and the swing motor 102B with electricity while the capacitor module 1 stores therein electricity generated by the assist motor 102A and the swing motor 102B.

Figure 2:
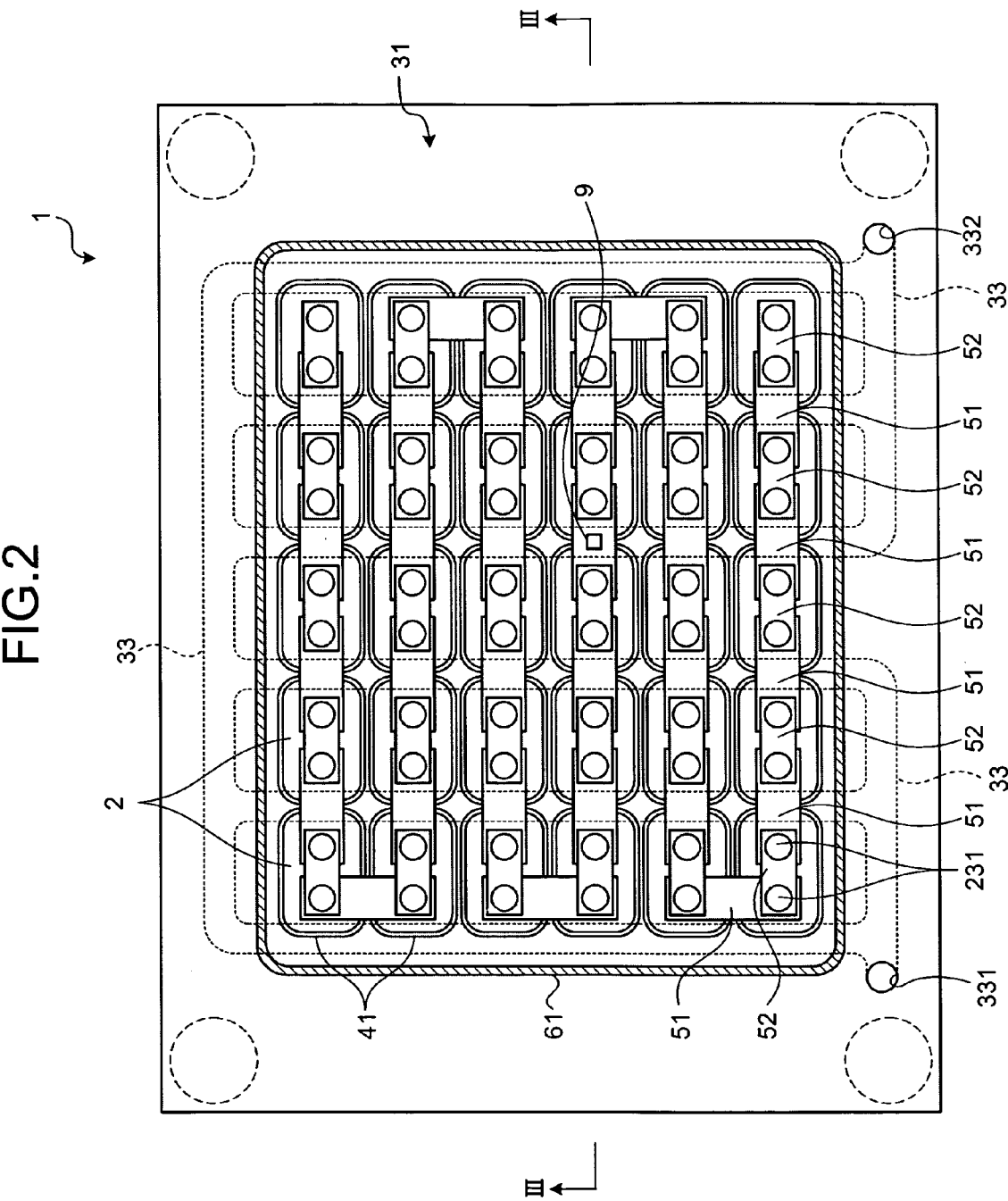
FIG. 2 is a schematic diagram viewed on a plane of a capacitor module.
Figure 3:
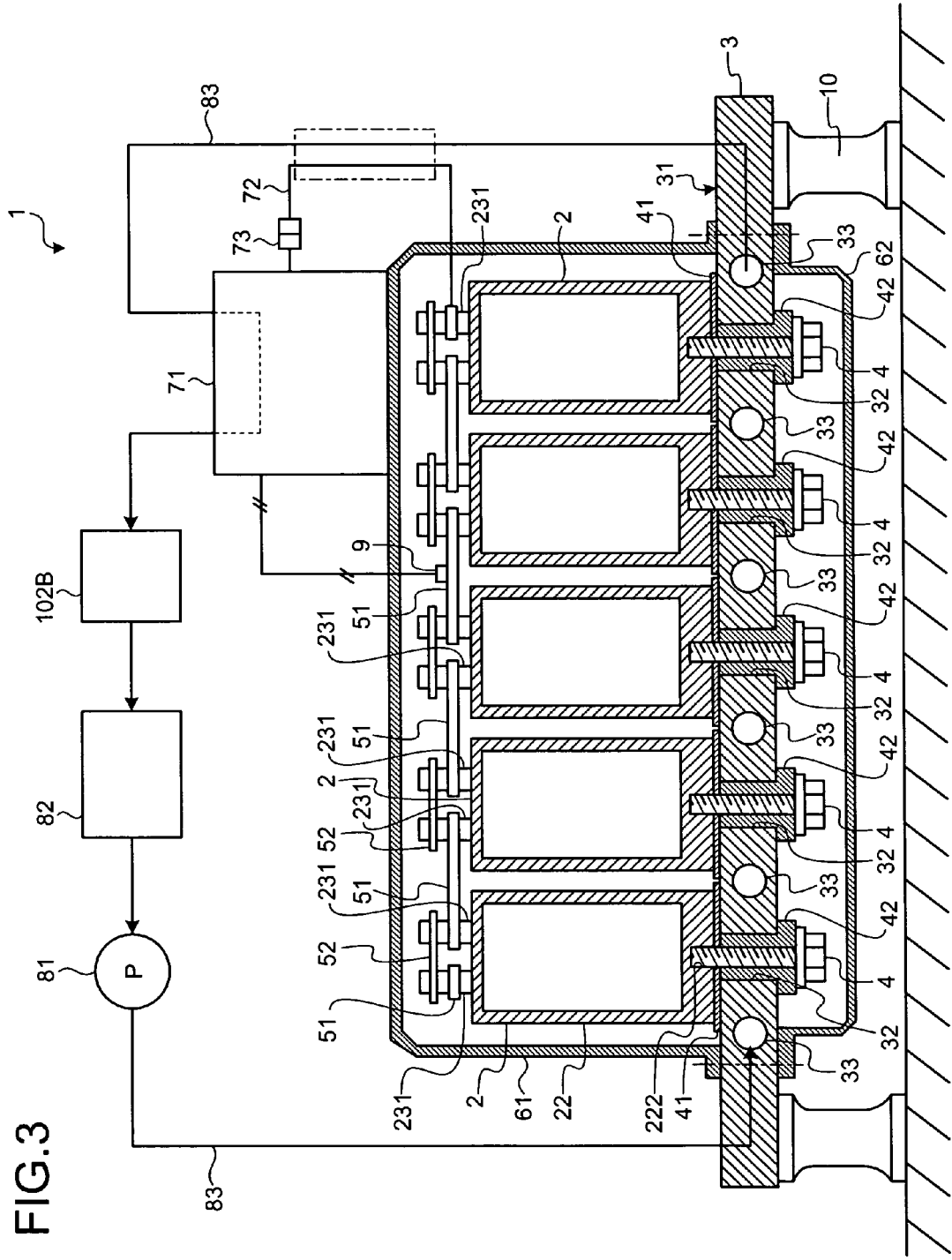
FIG. 3 is a cross-sectional view taken along the arrows III-III shown in FIG. 2.
Figure 4:
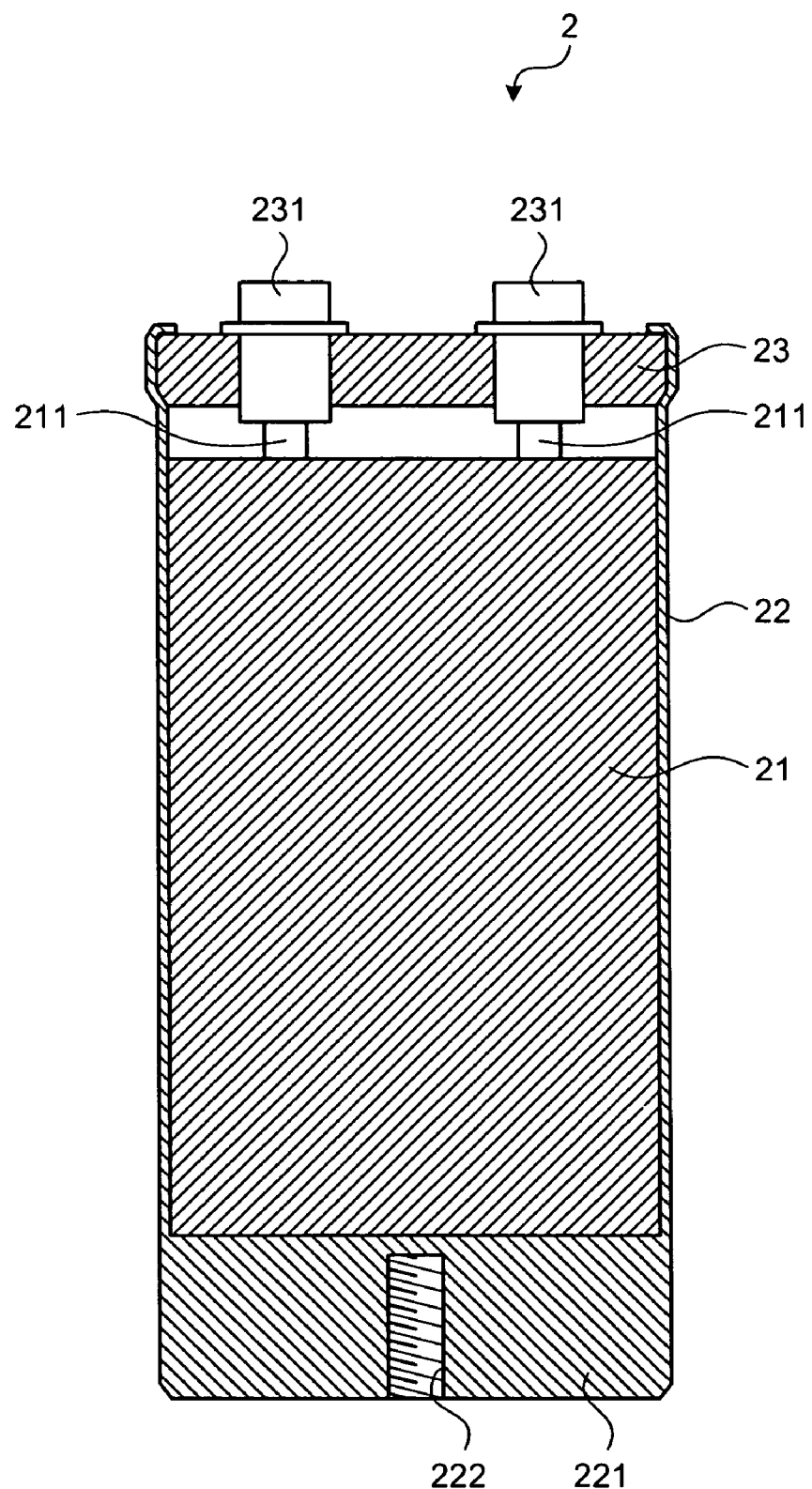
FIG. 4 is a cross-sectional view of a capacitor.

FIG. 2 is a schematic diagram viewed on a plane of the capacitor module, FIG. 3 is across-sectional view taken along the arrows of III-III shown in FIG. 2, and FIG. 4 is a cross-sectional view of a capacitor. The capacitor module 1 is formed by connecting plural capacitors 2 as shown in FIGS. 2 and 3. As shown in FIG. 4, the capacitor 2, viewed broadly, is configured with a capacitor case 22 that houses a capacitor element 21 and a terminal block 23.

The capacitor element 21 includes plural layers of a positive electrode and a negative electrode with a separator posed therebetween though not clearly shown in the figure. The positive electrode and the negative electrode are configured with a collecting electrode of metallic foil (e.g., aluminum foil) arranged between activated carbon sheets, and impregnated with electrolyte solution. Further, the capacitor element 21 includes an internal terminal 211 extended from each electrode inside the capacitor case 22. The capacitor case 22 is made of light metal (e.g., aluminum) and is a cylinder-shaped container which closes at a bottom part and opens at an upper part. The terminal block 23 is fixated on the capacitor case 22 such that the terminal block 23 closes the open upper part of the capacitor case 22. Further, external terminals 231, which are arranged on the terminal block 23, of the positive electrode and negative electrode are connected respectively to the internal terminals 211 of the capacitor element 21 inside the capacitor case 22.

Further, the capacitor 2 is substantially rectangular-cylinder-shaped, and a screw hole 222 is formed on an outer bottom wall surface of a bottom wall part (single wall) 221 of the capacitor case 22. The screw hole 222 serves to fixate the capacitor 2 on a fixated surface when the capacitor module 1 is formed. The screw hole 222 is formed as a female screw hole and opens downward. Further, the bottom wall part 221, on which the screw hole 222 is arranged, of the capacitor case 22 is made thicker than other walls such as side walls.

Figure 5:
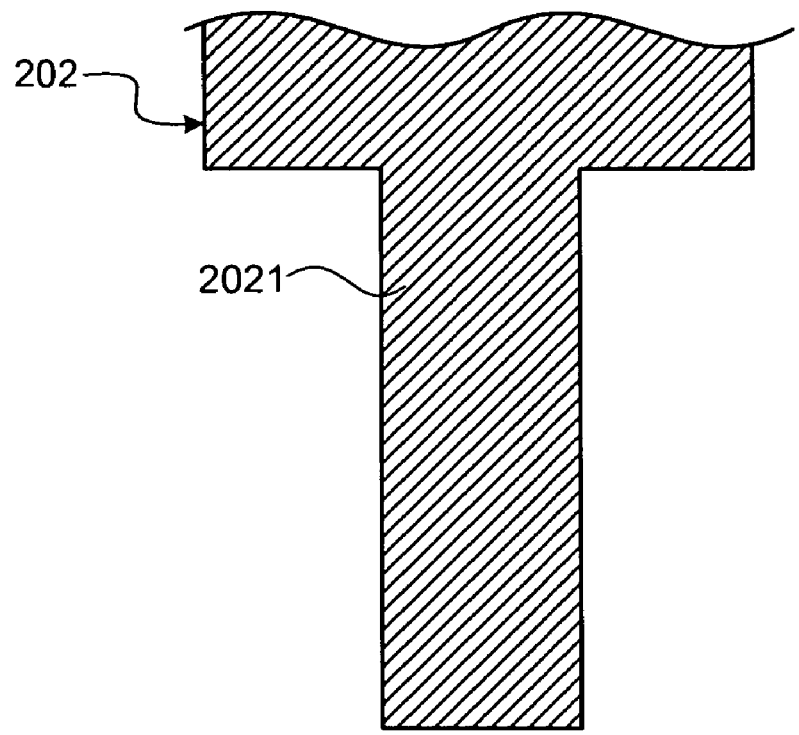
FIG. 5 is a vertical section of a mold.
Figure 5:
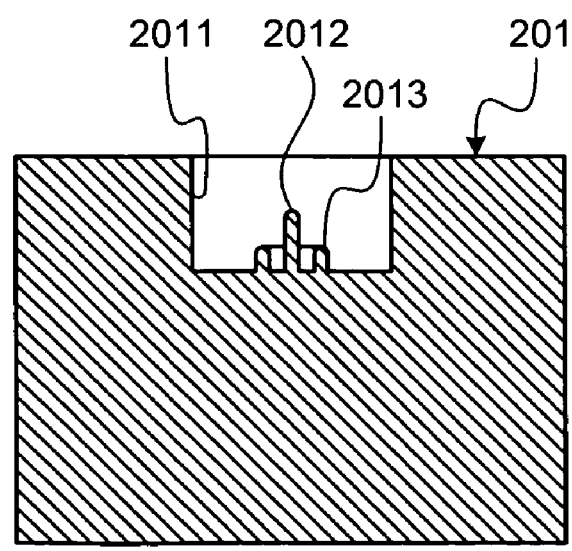
Figure 6:
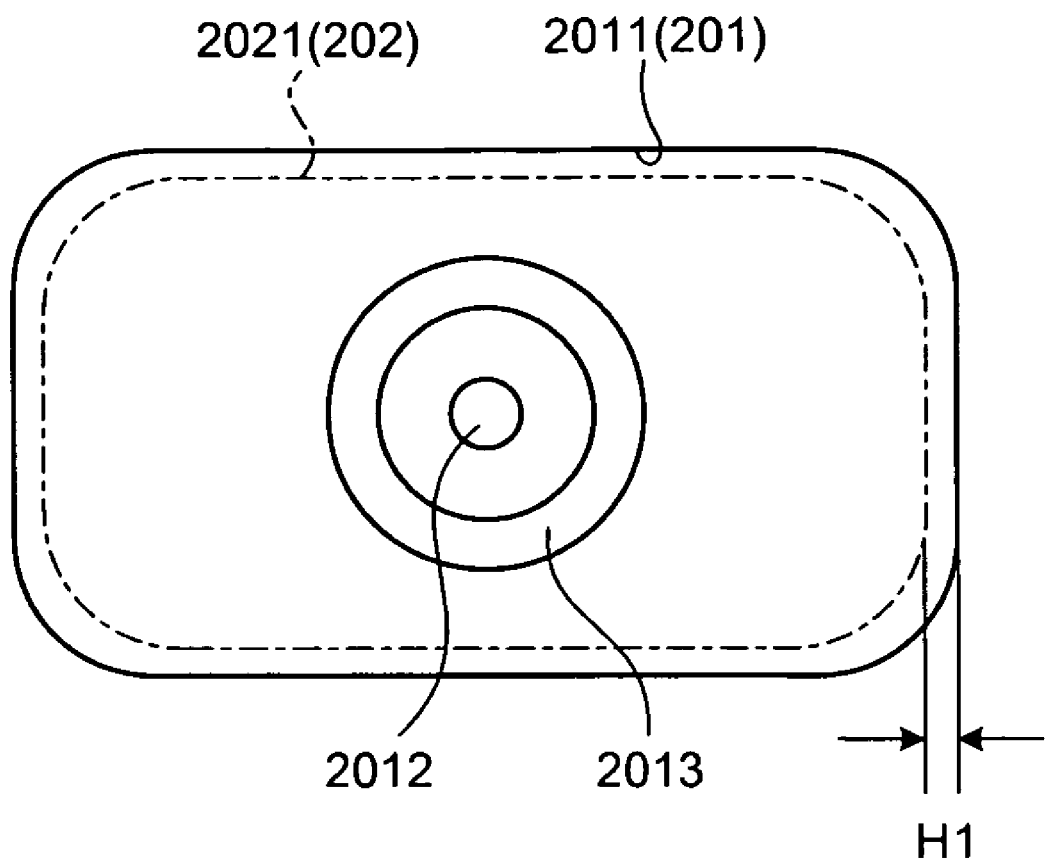
FIG. 6 is a plan view of the mold.
Figure 8:
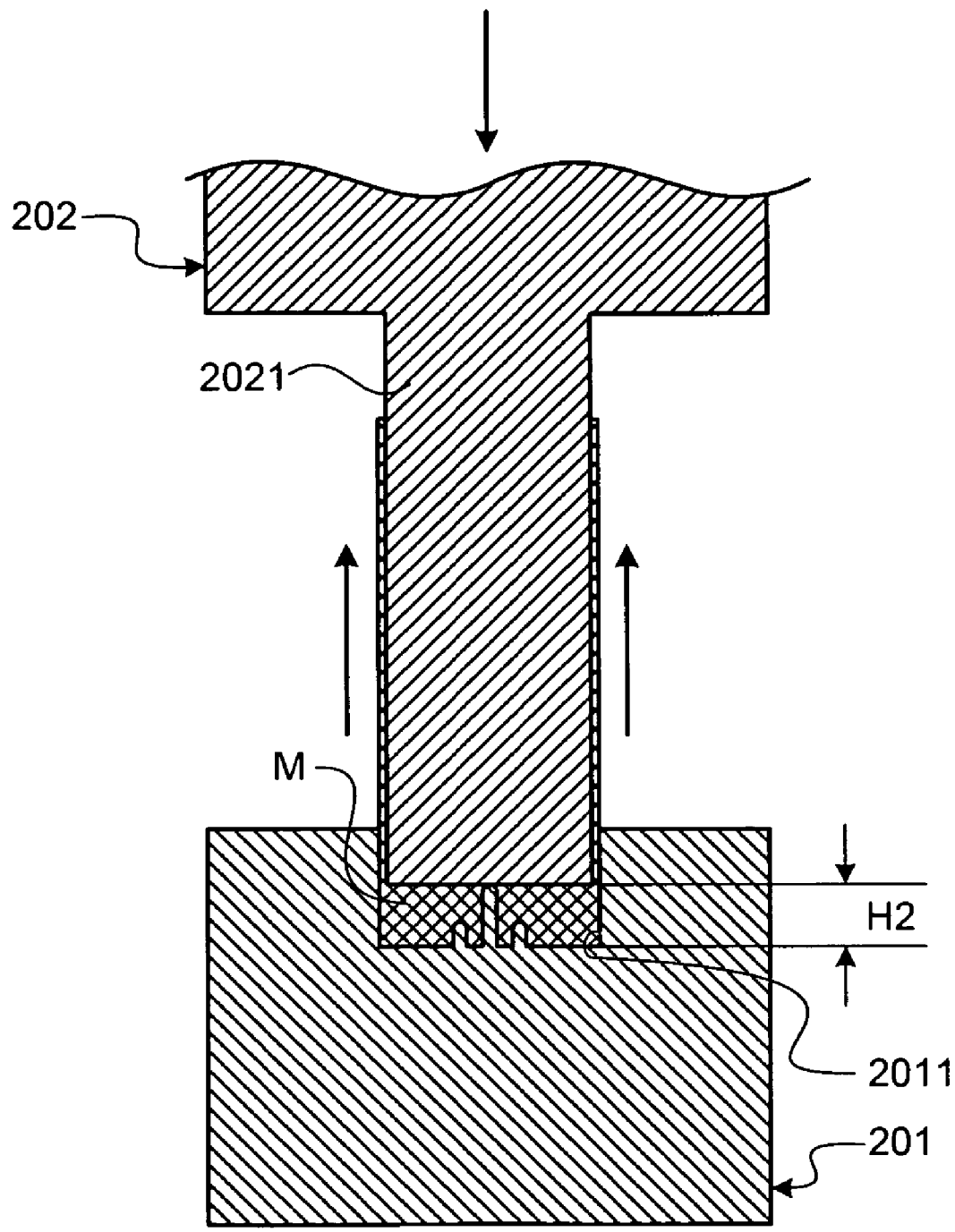
FIG. 8 is a conceptual diagram of the step of forming the capacitor case.
Figure 9:
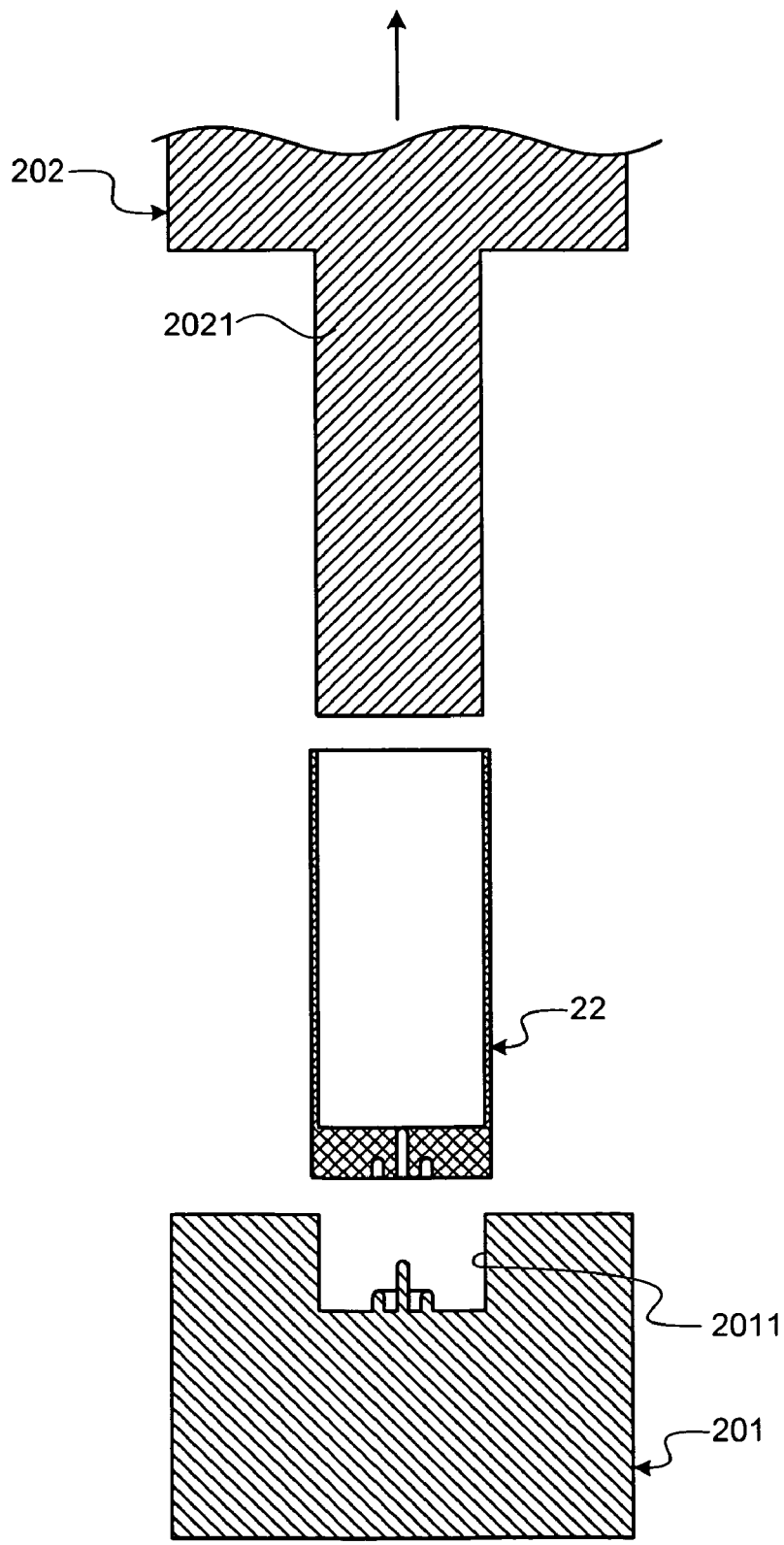
FIG. 9 is a conceptual diagram of the step of forming the capacitor case.
Figure 10:
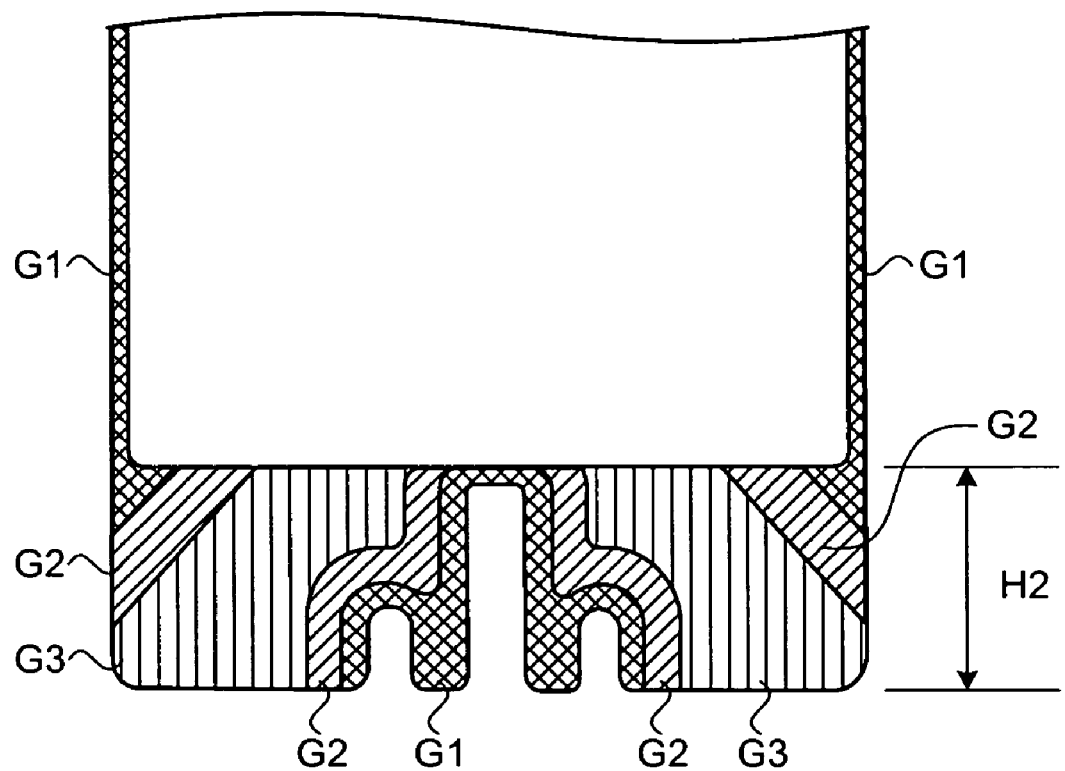
FIG. 10 is a conceptual diagram of a hardened state of the capacitor case.

A method of manufacturing the capacitor 2 is described below. FIG. 5 is a vertical section of a mold, FIG. 6 is a plan view of the mold, FIGS. 7 to 9 are conceptual diagrams of a step of forming the capacitor case, and FIG. 10 is a conceptual diagram of a hardened state of the capacitor case.

The capacitor case 22 is formed by impact molding with an outer mold 201 and an inner mold 202 shown in FIG. 5. The outer mold 201 is open upward and includes a cavity 2011 that has an upward opening of a rectangular shape with four arc-like corners. An inner bottom surface of the cavity 2011 has a circular-column-like first projection 2012, which extends upward approximately out of a center, and a cylinder-shaped second projection 2013, which surrounds the first projection 2012 and extends upward. The first projection 2012 extends farther upward than the second projection 2013. On the other hand, the inner mold 202 extends downward to the opening of the cavity 2011 of the outer mold 201, and has a pillar part 2021 having a rectangular cross section with four arc-like corners so that a bottom edge of the inner mold 202 is inserted into the cavity 2011 of the outer mold 201 with a space H1 apart from an inner side wall of the cavity 2011 as shown by a chain line in FIG. 6. The inner mold 202 is arranged in such a way that the inner mold 202 can move up and down relative to the outer mold 201.

Figure 7:
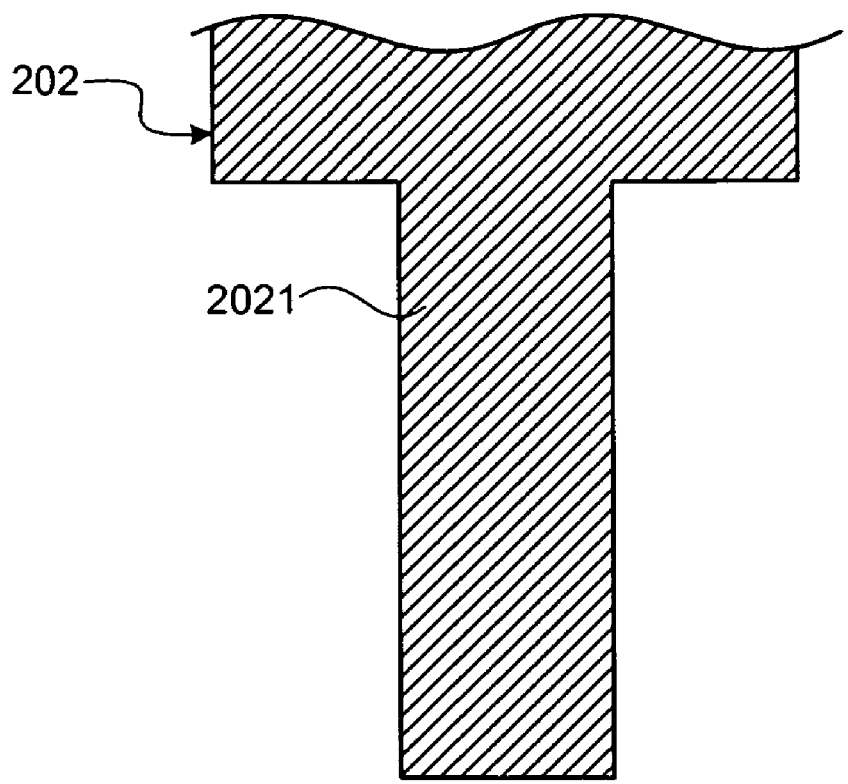
FIG. 7 is a conceptual diagram of a step of forming a capacitor case.
Figure 7:
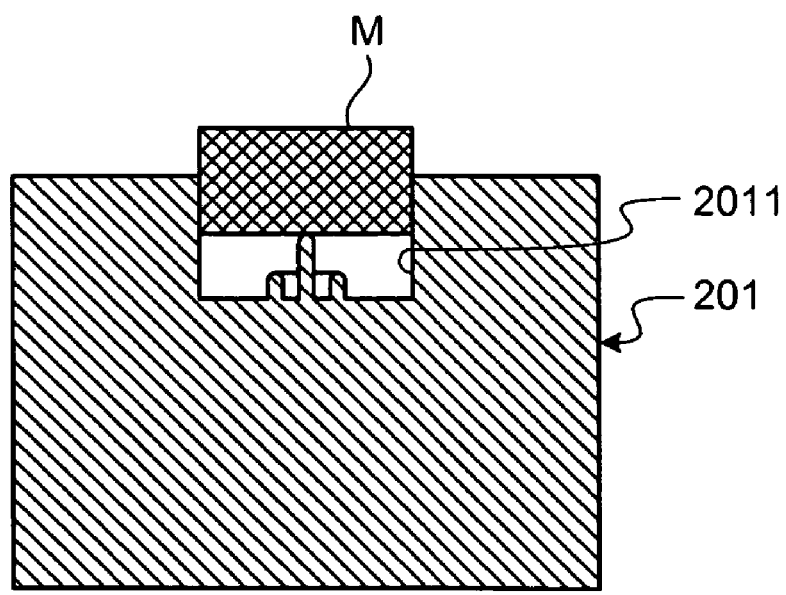

To form the capacitor case 22 with the outer mold 201 and the inner mold 202, firstly a chunk of soft metal M for making the capacitor case 22 is placed inside the cavity 2011 of the outer mold 201 as shown in FIG. 7. For the soft metal M, aluminum (e.g., A1110), which has an excellent impact moldability is used. Next, the inner mold 202 is moved downward to the outer mold 201 as shown in FIG. 8, and the inner mold 202 applies an impact force on the soft metal M to compress the same. The compressed soft metal M is fluidized inside the cavity 2011 of the outer mold 201, and extends out of the cavity 2011 in thickness of the space H1 between the outer mold 201 and the pillar part 2021 of the inner mold 202, rising along a side wall surface of the pillar part 2021. The rising part becomes a side wall part of the formed capacitor case 22 (see FIG. 10). Further, as shown in FIG. 8, the pillar part 2021 of the inner mold 202 is inserted into the cavity 2011 of the outer mold 201, and is stayed keeping a predetermined distance H2, which is longer than the projection length of the first projection 2012, between a lower end surface thereof and the inner bottom surface of the cavity 2011. The part corresponding to the predetermined distance H2 becomes the bottom wall part 221 of the formed capacitor case 22 (see FIG. 10). Next, the inner mold 202 is moved upward so as to be pulled out of the outer mold 201, and the formed capacitor case 22 is extracted from the outer mold 201 and the inner mold 202.

The formed capacitor case 22 is a container including the bottom wall part 221, thickness of which is the distance H2 between the outer mold 201 and the inner mold 202, with a closed bottom part and an open upper part. Further, in the impact molding, the compression causes work hardening of a fluidized part of the soft metal M. In a general impact molding, when the distance H2 is arranged between the outer mold 201 and the inner mold 202 in order to make the wall of the bottom wall part 221 thick, the soft metal M is not fluidized sufficiently because the compression is not propagated because of the distance H2, and thus work hardening is not caused well. Therefore, if the screw hole 222 is formed on the bottom wall part 221 thus formed, the screw hole 222 cannot have sufficient strength. In the present embodiment, however, because the impact force is applied on the soft metal M via the first projection 2012 and the second projection 2013 arranged on the outer mold 201, fluidization of the soft metal M occurs as if to avoid the first projection 2012 and the second projection 2013 and whereby the work hardening occurs. When the screw hole 222 is formed in this work-hardened part as described later, the strength of the screw hole 222 is increased. The degree of the work hardening becomes greater as travel distance of the fluidized soft metal M becomes greater. Specifically, as shown in FIG. 10, a part in proximity to the first projection 2012 and of the second projection 2013, and a part projecting out of the cavity 2011 of the outer mold 201 are parts with a high degree of work hardening (G1). Further, a part at some distance from the first projection 2012 and the second projection 2013, and a part adjacent to the part projecting out of the cavity 2011 are parts with a middle degree of work hardening (G2). A part formed inside the cavity 2011 where the wall is made thickest is a part with a low degree of work hardening (G3). As described above, the soft metal M is fluidized by a concave-convex part including the first projection 2012 and the second projection 2013 on the inner bottom surface of the cavity 2011 of the outer mold 201, to cause work hardening of the bottom wall part 221 of the capacitor case 22, where wall is made thicker.

Next, the screw hole 222 is formed on the bottom wall part 221 of the capacitor case 22. The screw hole 222 is formed using a hole part, which is formed on an outer bottom wall surface of the bottom wall part 221 by the first projection 2012. The hole part, which is a part with a high degree of work hardening (G1) as described above, enhances strength of the screw hole 222. Further, the second projection 2013 enhances strength of a part surrounding the screw hole 222. Next, the opening of the capacitor case 22 is formed to be wide. In this way, the capacitor case 22 is formed.

Lastly, as shown in FIG. 4, the capacitor element 21 is housed inside the capacitor case 22, and the terminal block 23 is fitted to the opening of the capacitor case 22, which is made wide, and the upper opening part of the capacitor case 22 is closed by the terminal block 23. Then, the opening edge of the capacitor case 22 is folded inward to fixate the terminal block 23 and the opening edge of the capacitor case 22. In this way, the capacitor 2 is formed.

Returning to FIGS. 2 and 3, the capacitor module 1 is described below. The capacitor module 1 includes a heat dissipater 3 on which the capacitor 2 is fixated. The heat dissipater 3 is formed in a plate-like shape with a fixation surface (fixated surface) 31 to fixate the capacitor 2 as an upper surface. The heat dissipater 3 is made of aluminum, which is light metal with relatively high thermal conductivity.

The heat dissipater 3 has plural through holes 32 which penetrate the heat dissipater 3 in a vertical direction. To the through hole 32, a fixation screw 4 which fixates the capacitor 2 is inserted. The fixation screw 4 is inserted into the through hole 32 from the lower surface of the heat dissipater 3, and is screwed in the screw hole 222 formed on the bottom wall part 221 of the capacitor 2 to fixate the capacitor 2 on the fixation surface 31. Further, with the capacitor 2 fixated on the fixation surface 31, a sheet member 41 made of insulating material (e.g., silicon) with thermal conductivity is interposed between an outer bottom wall surface of the bottom wall part 221 of the capacitor 2 and the fixation surface 31 of the heat dissipater 3. When the capacitor 2 is fixated on the fixation surface 31, the sheet member 41 placed between the outer bottom wall surface of the bottom wall part 221 of the capacitor 2 and the fixation surface 31 keeps the capacitor 2 and the fixation surface 31 disconnected and insulated from each other, and transfers heat produced by the capacitor 2 to the heat dissipater 3. Further, an interposed member 42 made of insulating material (e.g., synthetic resin) is interposed between the fixation screw 4 which fixates the capacitor 2 on the fixation surface 31 and the through hole 32 of the heat dissipater 3. The interposed member 42 is formed in a cylindrical shape so as to be inserted into the through hole 32, and has a flange which engages an lower opening of the fixation hole 32. That is, when the capacitor 2 is fixated on the fixation surface 31 by the fixation screw 4, the interposed member 42 is interposed between the fixation screw 4 and the through hole 32 to keep the fixation screw 4 and the through hole 32 disconnected and insulated from each other.

Plural capacitors 2 are fixated on the fixation surface 31 of the heat dissipater 3 in vertically and horizontally aligned manner as shown in FIG. 2. Further, in the vertical line and the horizontal line, the capacitors 2 are arranged in such a way that the external terminal 231 on a positive electrode side faces the external terminal 231 on a negative electrode side. The external terminals 231 of the different electrodes are connected together via a connection clamp 51. That is, in the present embodiment, the capacitors 2 are connected in series via the connection clamp 2. Further, each capacitor 2 includes a balance circuit 52 which crosses the external terminals 231. The balance circuit 52 regulates voltage of the capacitor element 21 within a predetermined range. A female screw hole (not shown in the figure) is formed on an upper end of the external terminal 231 of the capacitor 2, and the connection clamp 51 and the balance circuit 52 are attached with a male screw (not shown in the figure), which is screwed in the female screw hole. Here, although not clearly shown in the figure, a side wall surface of each capacitor 2 is covered by a film made of insulating material (e.g., synthetic resin), so as to enhance electrical insulation.

Further, an upper cover (cover) 61 is arranged over the fixation surface (upper surface) 31 of the heat dissipater 3. The upper cover 61 is formed to cover all the capacitors 2 fixated on the fixation surface 31, and is made of aluminum, which is light metal with relatively high thermal conductivity. Further, a bottom cover (cover) 62 is arranged below a lower surface of the heat dissipater 3. The bottom cover 62 is formed to cover all the fixation screws 4 inserted through the heat dissipater 3 from the lower surface, and is made of aluminum, which is light metal with relatively high thermal conductivity. The upper cover 61 and the bottom cover 62 are fixated on the heat dissipater 3 with a screw not shown in the figure so as to retain the heat dissipater 3 in between. Here, although, in the description above, the upper cover 61 and the bottom cover 62 of aluminum are described as an example, the upper cover 61 and the bottom cover 62 are not limited to the covers made of aluminum and may be made of other materials.

A controller 71, which controls the capacitor 2, is fixated on the outer upper surface of the upper cover 61. The controller 71 is a control unit integrating a control unit, an electrical power converter, and a booster not shown in the figure. The control unit performs a charge/discharge control of the capacitor 2. The voltage converter converts direct-current power output from the capacitor 2 into alternating-current power to provide the assist motor 102A and the swing motor 102B with the alternating-current power, or converts alternating-current power output from the assist motor 102A and the swing motor 102B into direct-current power to provide the capacitor 2 with the direct-current power. The booster boosts voltage of electricity output from the capacitor 2. Further, a connector 73 is arranged on an electrical wiring 72 which connects the capacitor 2 and the controller 71. The connector 73 is disconnected in maintenance of the capacitor 2 or the controller 71 described later, whereby safety of maintenance can be secured. Further, although not shown in the figure, a fuse is arranged on the electrical wiring 72.

As shown in FIG. 3, a temperature sensor 9, which detects external temperature of the capacitor 2, is connected to the control unit of the controller 71. The temperature sensor 9 is attached to the connection clamp 51 approximately at center of the capacitors 2, which are arranged in order in the inner region of the upper cover 61 covering the capacitors 2. That is, the controller 71 performs the charge/discharge control according to the external temperature of the capacitor 2 detected by the temperature sensor 9 in the inner region of the upper cover 61. Specifically, when the external temperature of the capacitor 2 is above preset temperature set by the controller 71 in advance, the controller 71 gives warning, reduces frequency of charge/discharge of the capacitor 2 to suppress rise in temperature, or stops charge/discharge of the capacitor 2. Here, plural temperature sensors 9 may be arranged inside the upper cover 61, whereby accuracy of temperature detection is enhanced because the temperature sensors 9 can be corrected.

Further, a cooling path 33, through which cooling water (cooling medium) flows to promote heat dissipation of the capacitor 2, is arranged in a cross section of the heat dissipater 3. As shown in FIG. 2, the cooling path 33 is formed below each capacitor 2 fixated in order on the fixation surface 31 of the heat dissipater 3, and plural cooling paths 33 are arranged parallel to each other along the fixation surface 31 of the heat dissipater 3, avoiding the through holes 32. The cooling paths 33 arranged parallel to each other are communicated with each other via one end of each cooling path 33, while another ends of the cooling paths 33 are combined and directed in two different directions, so that a port in one direction forms a water entrance 331 and a port in another direction forms a water exit 332 both open to the outside of the heat dissipater 3. Here, the heat dissipater 3 is formed by three divided parts, which are an extruded part where the cooling paths 33 are formed in parallel and two machined parts where each end of the cooling path 33 is formed, and each machined part is welded and attached to the extruded part. Further, the heat dissipater 3 may have an integral casting structure. Ends of a cooling pipe 83 are connected respectively to the water entrance 331 and the water exit 332 of the cooling path 33. A pump 81 and a cooler (e.g., radiator) 82 are arranged in the cooling pipe 83. Specifically, the pump 81 circulates cooling water through the cooling pipe 83 and the cooling path 33, and the circulated cooling water is cooled down in the cooler 82. Thus, heat of the capacitor 2 fixated on the heat dissipater 3 is dissipated. Here, although, in the present embodiment, the cooling path 33 is attached in parallel to the rows of the capacitors 2, the cooling path 33 may be attached orthogonal to the rows of the capacitors 2, not limited to the present embodiment.

The cooling pipe 83 is arranged to pass through the controller 71. Further, the cooling pipe 83 is arranged to pass through the swing motor 102B. Specifically, the pump 81 circulates cooling water, which is cooled down in the cooler 82, through the cooling path 33 of the heat dissipater 3, the controller 71, and the swing motor 102B and back to the cooler 82. Here, the cooling water at the lowest temperature, after being cooled down in the cooler 82, is transferred first to the cooling path 33 of the heat dissipater 3, next to the controller 71 and to the swing motor 102B in turn. Because the cooling water at the lowest temperature is first transferred to the heat dissipater 3, heat dissipation of the capacitor 2, which has low allowable temperature limit, is prioritized, and in ascending order of the allowable temperature limit, heat of the controller 71, and next of the swing motor 102B is dissipated. Further, the cooling pipe 83 is arranged integrally with the electrical wiring 72 from the water entrance 332 of the cooling path 33 to the controller 71. Thus, a piping space of the cooling pipe 83 and an arrangement space of the electrical wiring 72 are shared to save space.

In the capacitor module 1 configured as described above, the heat dissipater 3 is attached to the hydraulic shovel (attached part) 100 by a leg 10 made of vibration-proof rubber.

In the above described capacitor 2, the screw hole 222 for fixation is arranged on the outer wall surface of the capacitor case 22 housing the capacitor element 21 to fixate the capacitor 2 on the fixation surface 31 of the heat dissipater 3. As a result, because the capacitor 2 can be fixated on the fixation surface 31 with the fixation screw 4, the capacitor 2 can be fixated with reliability and durability secured even under a condition where very strong vibration is continuously caused, for example, on the hydraulic shovel (construction machinery) 100.

Further, in the above described capacitor 2, the screw hole 222 is arranged on the outer bottom wall surface of the capacitor case 22 for fixation to the fixation surface 31 of the heat dissipater 3. The capacitor case 22 houses the capacitor element 21 and the external terminal 231 is formed in the upper part of the capacitor case 22 to be connected to the capacitor element 21. As a result, the capacitor 2 can be fixated with reliability and durability secured even under a condition where very strong vibration is continuously caused, for example, on the hydraulic shovel (construction machinery) 100. Especially, because the bottom of the capacitor 2 including the external terminal 231 arranged on the upper part, can be fixated on the fixation surface 31 with the fixation screw 4, plural capacitors 2 arranged in order can be fixated on the fixation surface 31. Thus, the capacitor module 1 can be compactified and downsized.

Figure 11:
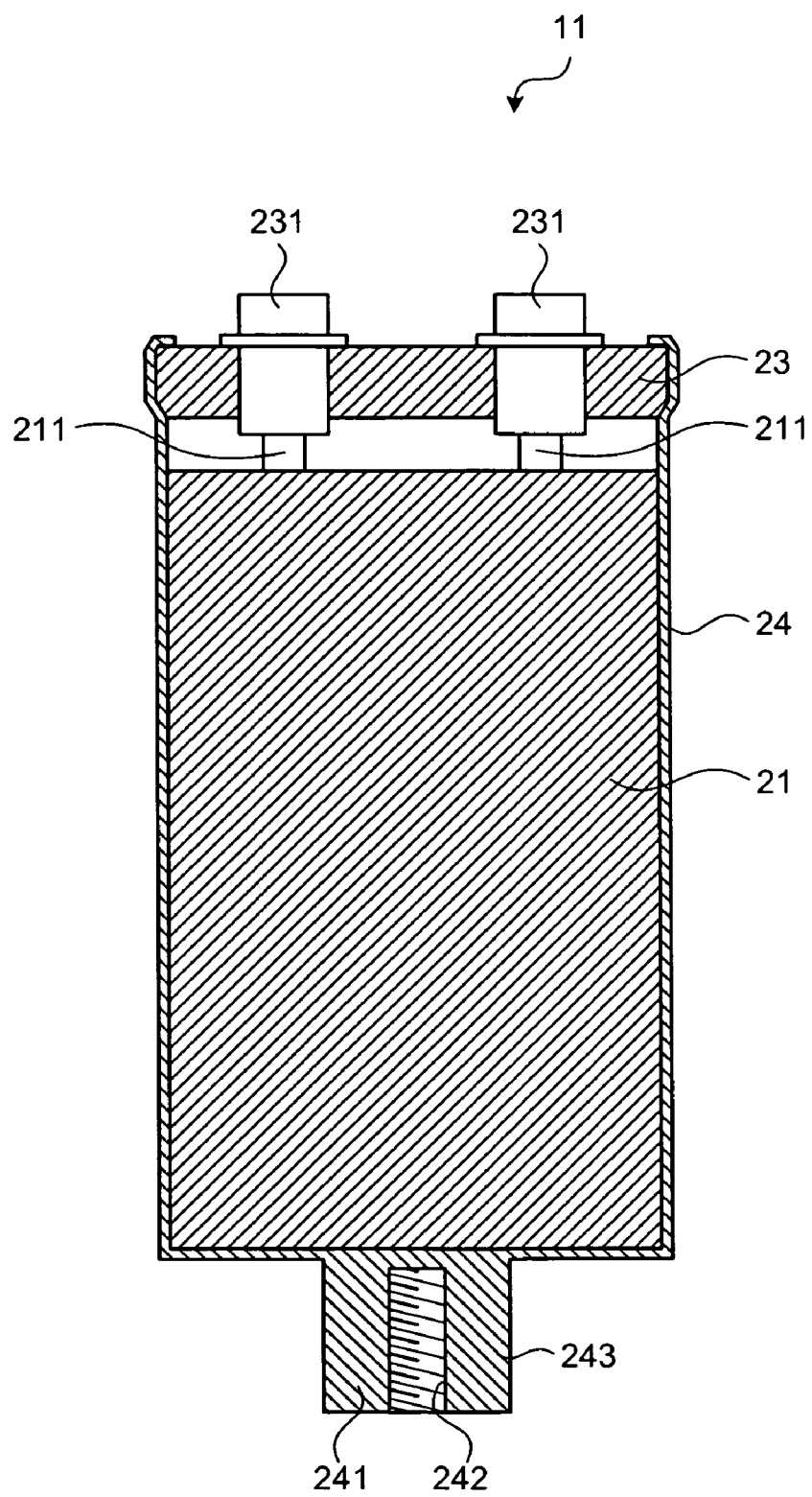
FIG. 11 is a cross-sectional view of another embodiment of the capacitor.

Further, in the above described capacitor 2, the bottom wall part (single wall) 221 of the capacitor case 22 is made thicker than other walls, and the screw hole 222 is arranged on the bottom wall part 221. As a result, enough depth of the screw hole can be taken, whereby the capacitor 2 can be fixated on a fixated surface with reliability and durability further secured. Here, as shown in FIG. 11, as a structure that allows enough depth of the screw hole to be taken, a convex part 243 may be formed on a bottom wall part 241 of a capacitor case 24 and a screw hole 242 may be arranged on the outer wall surface of the convex part 243. In application of the capacitor 11 shown in FIG. 11, the convex part 243 may be inserted into the interposed member 42 and fixated by the fixation screw 4. Further, if the convex part 243 is formed to be noncircular pillar-shaped, an orientation of electrodes of the external terminal 231 can be determined easily in fixating the capacitor 11 on the heat dissipater 3, whereby assemblability of the capacitor module to which the capacitor 11 is applied can be enhanced, and moreover rotation of the capacitor 11 in screwing the fixation screw can be prevented.

Figure 12:
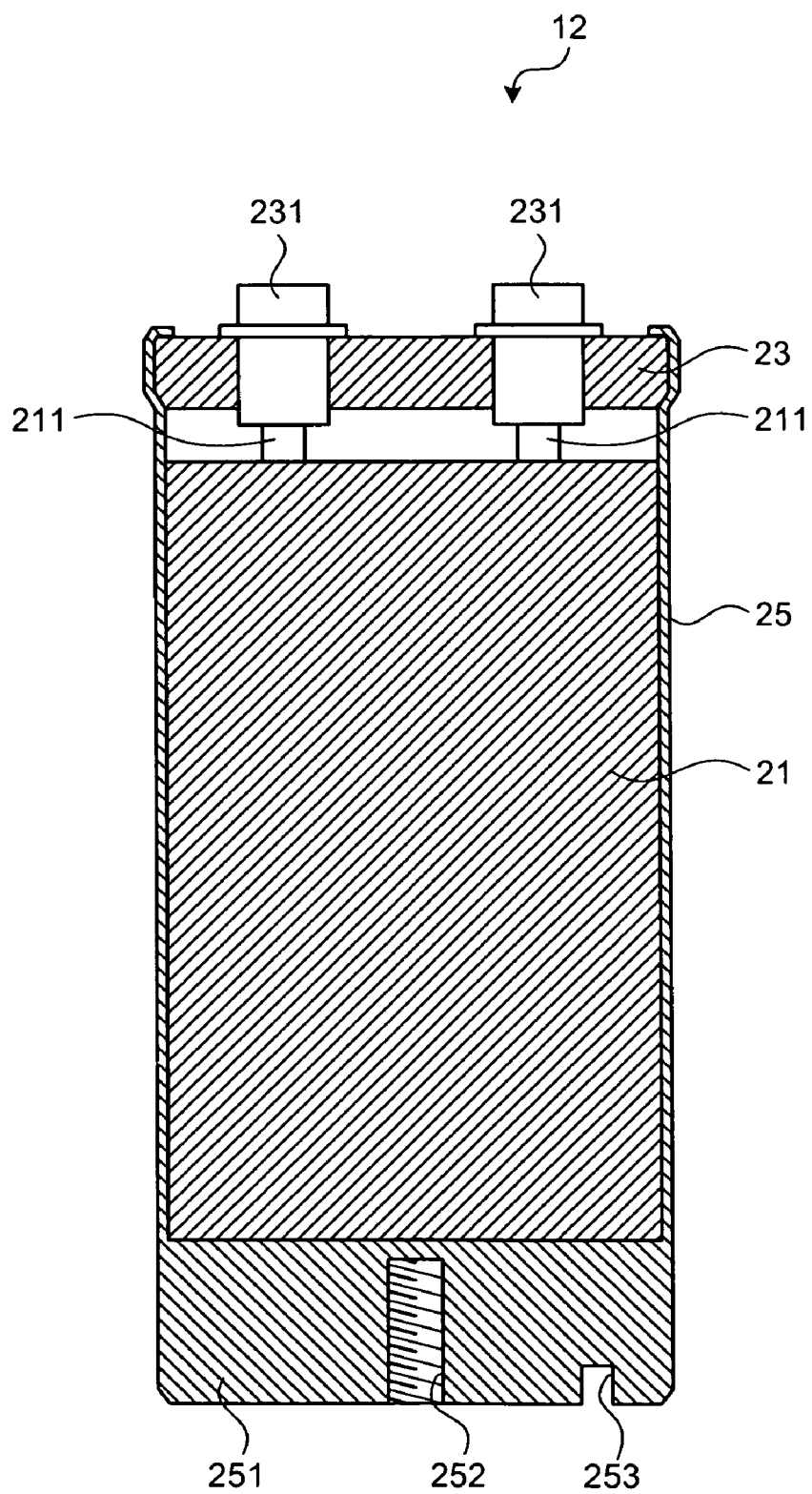
FIG. 12 is a cross-sectional view of another embodiment of the capacitor.

Further, a capacitor 12 shown in FIG. 12 may be applied as the capacitor. On an outer bottom wall surface of a bottom wall part 251 of a capacitor case 25 in the capacitor 12, a screw hole 252 is arranged and moreover an engaging part 253 which engages the heat dissipater on the fixation surface 31 side is arranged. The engaging part 253 shown in FIG. 12 is formed as a concave part. As a result, if an engaged part (not shown in the figure) with which the engaging part 253 engages is arranged on the fixation surface 31 side, an orientation of electrodes of the external terminal 231 can be determined easily in fixating the capacitor 12 on the heat dissipater 3, whereby assemblability of the capacitor module to which the capacitor 12 is applied can be enhanced, and moreover rotation of the capacitor 12 in screwing the fixation screw 4 can be prevented. Here, the engaging part 253 may be a convex part, not limited to the concave part shown in FIG. 12, and the engaged part may be arranged on the fixation surface 31 depending on the form of the engaging part 253. Further, the engaging part 253 may be arranged on a rim part of the outer bottom wall surface, not limited to the position shown in FIG. 12.

Figure 13:
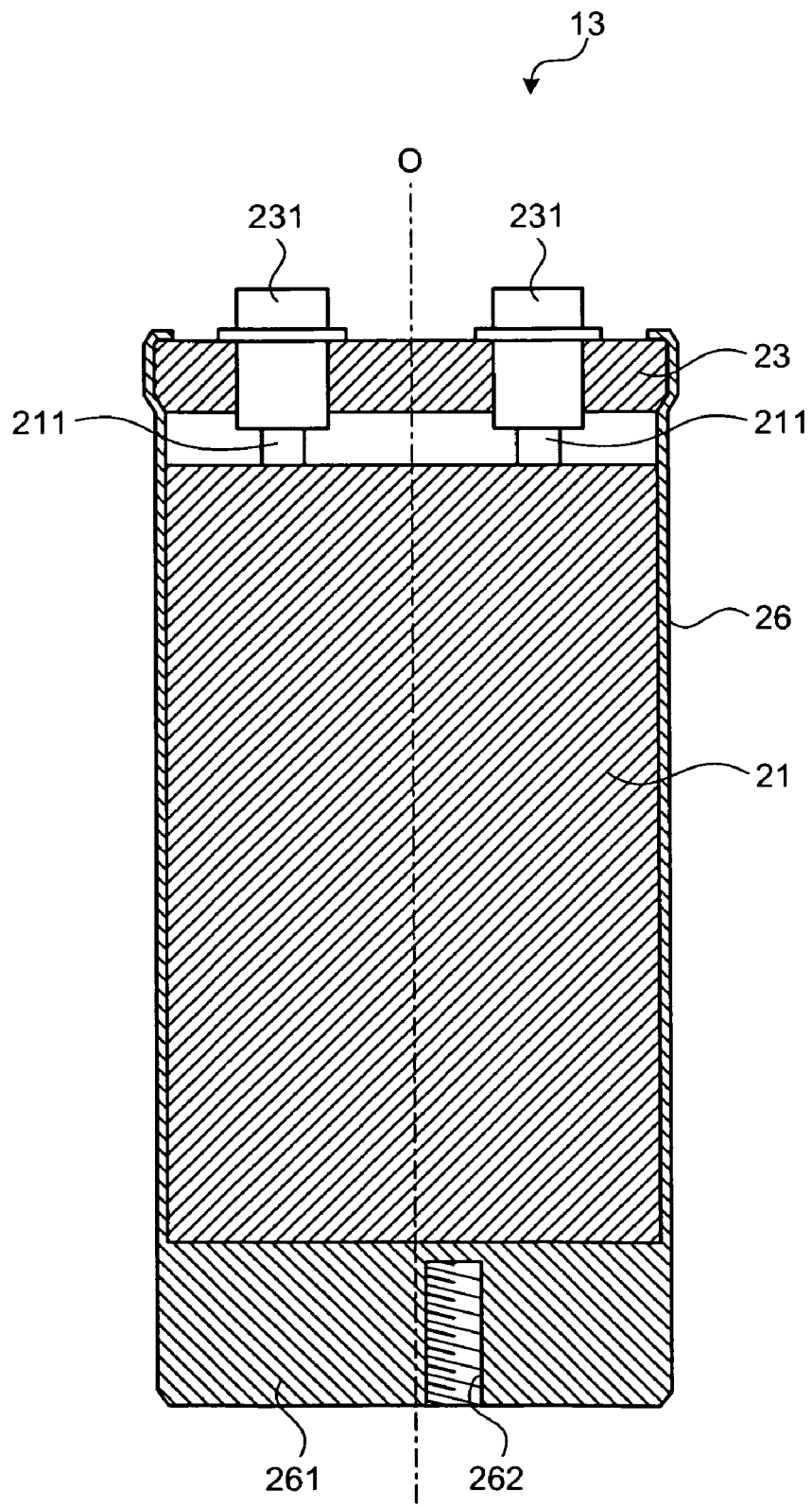
FIG. 13 is a cross-sectional view of another embodiment of the capacitor.

Further, as shown in FIG. 13, a capacitor 13, in which a screw hole 262 is arranged on a position some distance away from a center of an outer bottom wall surface of a bottom wall part 261 of a capacitor case 26, may be applied as the capacitor. As a result, an orientation of electrodes of the external terminal 231 can be determined easily in fixating the capacitor 13 on the heat dissipater 3, whereby assemblability of the capacitor module to which the capacitor 13 is applied can be enhanced.

Figure 14:
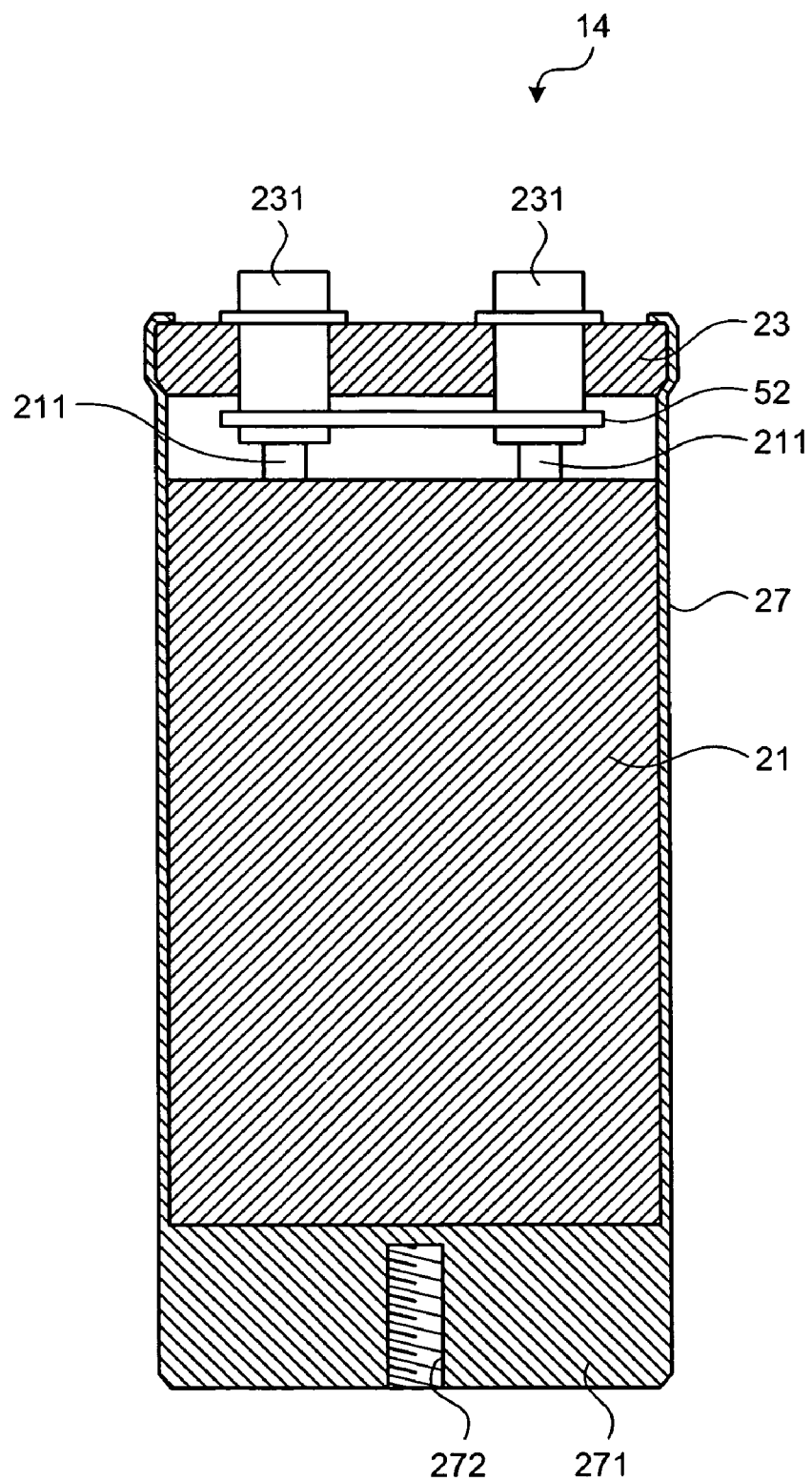
FIG. 14 is a cross-sectional view of another embodiment of the capacitor.

Further, as shown in FIG. 14, a capacitor 14, where the balance circuit 52 regulating voltage of the capacitor element 21 within a predetermined range is arranged inside a capacitor case 27, may be applied as the capacitor. A screw hole 272 is arranged on center of an outer bottom wall surface of a bottom wall part 271 of the capacitor case 27. When the balance circuit 52 is arranged outside the capacitor 14, a male screw (not shown in the figure) is screwed in a female screw hole (not shown in the figure) arranged on top end of the external terminal 231 as described above, whereas, when the balance circuit 52 is previously installed inside the capacitor case 27, installation step of the balance circuit 52 is eliminated, whereby assemblability of the capacitor module to which the capacitor 14 is applied can be enhanced.

Further, although, in the above embodiment, the figure shows one screw hole arranged on the capacitor case, plural screw holes may be arranged on the capacitor case.

The method of manufacturing the capacitor 2 described above is a method of manufacturing the capacitor 2 by forming the close-bottomed cylinder-shaped capacitor case 22 by applying an impact force to the soft metal M placed in the cavity 2011 of the outer mold 201 with the inner mold 202, and includes a step of applying an impact force to the soft metal M via the concave-convex part including the first projection 2012 and the second projection 2013 arranged on the inner bottom surface of the cavity 2011, and a step of forming the screw hole 222 on the outer bottom wall surface of the capacitor case 22 formed by the concave-convex part including the first projection 2012 and the second projection 2013. Specifically, in forming the capacitor case 22 by the impact molding, the soft metal M is fluidized by the concave-convex part including the first projection 2012 and the second projection 2013 arranged on the inner bottom wall of the cavity 2011 of the outer mold 201, to cause work hardening of the bottom wall part 221 of the capacitor case 22, and the screw hole 222 is formed on the outer bottom wall surface of the work-hardened capacitor case 22, whereby the screw hole 222 and a part on which the screw hole 222 is arranged can be intensified.

The above mentioned capacitor module 1 includes the capacitor 2 which has the screw hole 222 for fixation on the outer wall surface of the capacitor case 22 housing the capacitor element 21, and the heat dissipater 3 on which the plural capacitors 2 are fixated by screwing the fixation screw 4 in the screw hole 222 of the capacitor case 22. As a result, even when the capacitor module 1 is used under a condition where very strong vibration is continuously applied, for example, when the capacitor module 1 is mounted on the hydraulic shovel (construction machinery) 100, the capacitor 2 can be fixated with reliability and durability secured. Further, because, by screwing the fixation screw 4 in the screw hole 222, an adhesion of the outer bottom wall surface of the capacitor case 22 on the fixation surface 31 of the heat dissipater 3 is strengthened, heat of the capacitor 2 can be dissipated by transferring heat produced by the capacitor 2 to the heat dissipater 3 as needed. That is, a heat dissipation structure which suitably adjusted to an increase of an internal temperature of the capacitor 2 can be provided.

Further, in the capacitor module 1, the external terminal 231 of the capacitor 2 is arranged on the upper part of the capacitor case 22, and the screw hole 222 is arranged on the outer bottom wall surface of the capacitor case 22. As a result, because the bottom of the capacitor case 22 having the external terminal 231 on the upper part can be fixated on the fixation surface 31 of the heat dissipater 3 with the fixation screw 4, plural capacitors 2 arranged in order can be fixated on the fixation surface 31, whereby the module can be downsized.

Further, the capacitor module 1 includes, the cooling path 33 arranged in the cross section of the heat dissipater 3 and through which cooling water (cooling medium) flows, the cooler 82 which cools down the cooling water, and the pump 81 which transfers the cooling water from the cooler 82 to the cooling path 33. As a result, the cooling water further enhances heat dissipation of the capacitor 2. That is, a heat dissipation structure which is further suitably adjusted to an increase of an internal temperature of the capacitor 2 can be provided.

Further, in the capacitor module 1, the heat dissipater 3 is made of metallic material, and the sheet member 41 made of insulating material is interposed between the outer bottom wall surface of the capacitor 2 and the fixation surface 31 of the heat dissipater 3, and the interposed member 42 made of insulating material is interposed between the fixation screw 4 and the heat dissipater 3. As a result, electrical insulation of the capacitor 2 can be enhanced with the above heat dissipation structure maintained.

Further, the upper cover 61 and the bottom cover 62 (cover) cover the capacitor 2 and the fixation screw 4 of the capacitor module 1. As a result, a drip-proof structure and a dust-proof structure of the capacitor 2 can be obtained.

Further, in the capacitor module 1, the temperature sensor 9 that detects temperature of the capacitor 2 is arranged inside the upper cover 61, and, the controller 71 that performs a charge/discharge control of each capacitor 2 according to the temperature detected by the temperature sensor 9 is arranged outside the upper cover 61. As a result, a control of the capacitor 2 can be performed according to the heat dissipation, whereby safety of the capacitor module 1 can be enhanced. Further, because the controller 71 that controls the capacitor 2 is arranged outside the cover, the capacitor module 1 that includes the controller 71 can be realized. Specifically, for example, the capacitor module 1 can be mounted on construction machinery and the like together with the controller 71.

Further, the capacitor module 1 includes the booster that boosts output voltage of the capacitor 2. As a result, capacity, quantity, and charge/discharge voltage of the capacitor 2 can be decreased, whereby space-saving of the capacitor module 1 can be realized. Specifically, for example, the capacitor module 1 can be mounted in an empty space of the hydraulic shovel (construction machinery) 100 without changing physical appearance of the same.

Further, in the capacitor module 1, the leg 10 made of vibration-proof rubber is arranged on the heat dissipater 3. As a result, a vibration-proof structure can be achieved, whereby the capacitor module 1 can be fixated with reliability and durability secured even under a condition where very strong vibration is continuously caused, for example, when the capacitor module 1 is mounted on the hydraulic shovel (construction machinery) 100 as the attached part.

Figure 15:
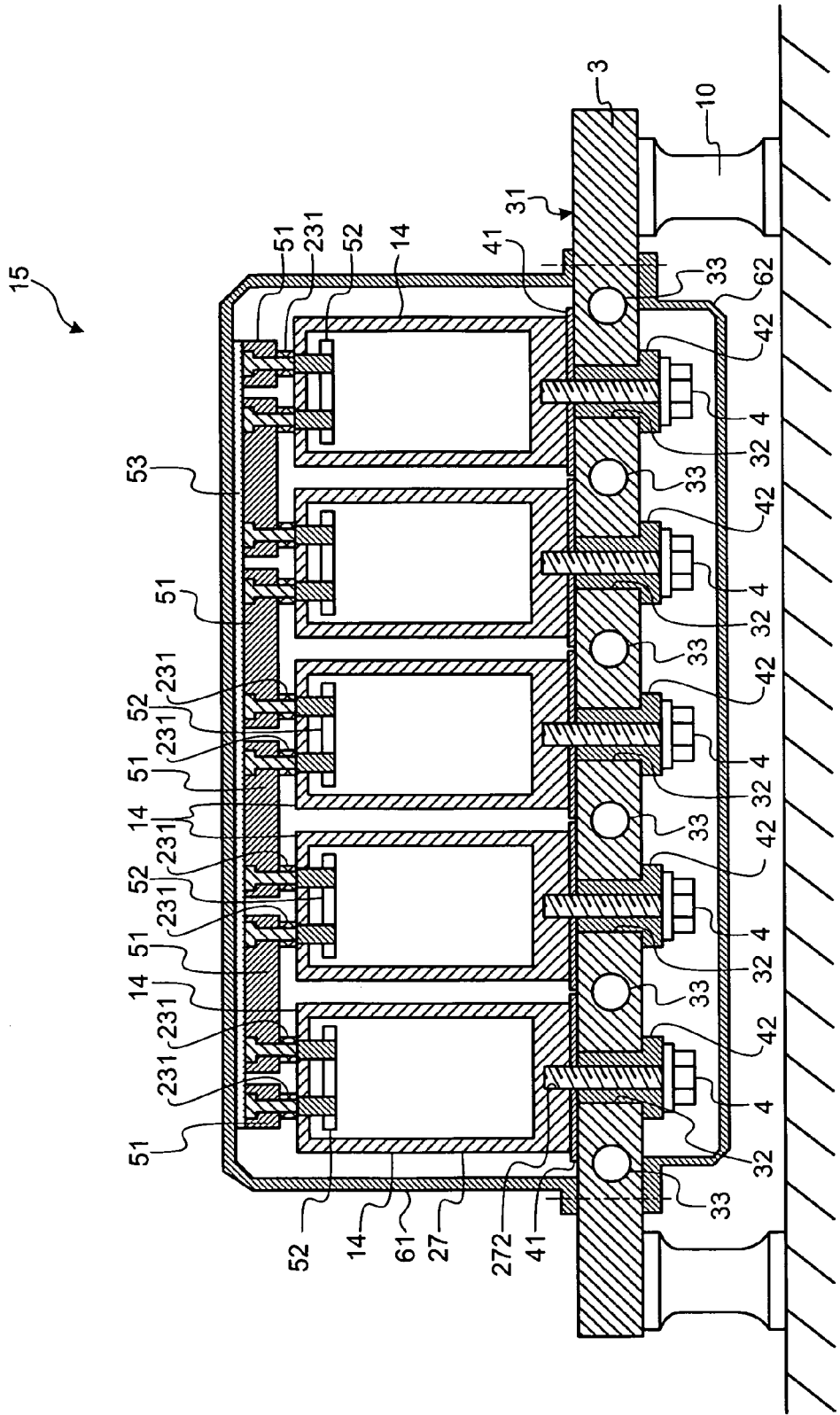
FIG. 15 is a conceptual diagram of another embodiment of the capacitor module.

On the other hand, FIG. 15 is a conceptual diagram of another embodiment of the capacitor module. In a capacitor module 15 shown in FIG. 15, a sheet member 53 made of insulating material is interposed between the upper cover 61 and the connection clamp 51. The connection clamp 51 is made of metallic material with relatively high thermal conductivity (e.g., aluminum). Here, contrary to FIG. 3, in order to arrange the connection clamp 51 along an inner wall surface of the upper cover 61, the capacitor (see FIG. 14), where the balance circuit 52 is arranged inside the capacitor case 27, is applied. Alternatively, the capacitor may be configured to include the balance circuit 52 below the connection clamp 51 outside the capacitor case 27. The capacitor module 15 configured as described above dissipates heat produced by the capacitor 14 from the connection clamp 51 via the upper cover 61, whereby heat dissipation performance of the capacitor 14 can be enhanced.

INDUSTRIAL APPLICABILITY

As described above, the present invention is suitable for construction machinery, on which very strong vibration is continuously caused.

The invention claimed is:

1. A capacitor module comprising:
    a plurality of capacitors each including a capacitor case which houses a capacitor element, the capacitor case having an outer bottom wall part thicker than other walls and a screw hole formed in the outer bottom wall part; and
    a heat dissipater to which each of the capacitors is fixated with a fixation screw screwed into the screw hole, wherein
    the heat dissipater is made of metallic material, and
    a sheet member, which is made of electrically insulating and thermally conductive material, is interposed between an outer wall surface of the capacitor and the heat dissipater,
    an interposed member made of electrically insulating material is interposed between the fixation screw and the heat dissipater.

2. The capacitor module according to claim 1, wherein the heat dissipater includes, in a cross section, a cooling path through which cooling medium flows.

3. The capacitor module according to claim 1, wherein the capacitor is covered by a cover.

4. The capacitor module according to claim 1, wherein the capacitor and the fixation screw are covered by a cover.

5. The capacitor module according to claim 3, wherein the cover is made of metallic material.

6. The capacitor module according to claim 3, wherein a sheet member made of insulating material is interposed between the cover and a connection clamp that electrically connects the plurality of capacitors together.

7. The capacitor module according to claim 3, further comprising:
    a temperature sensor arranged inside the cover to detect temperature of the capacitor, and
    a controller attached outside the cover to perform a charge/discharge control of each of the capacitors according to temperature detected by the temperature sensor.

8. The capacitor module according to claim 7, wherein the temperature sensor is arranged on a connection clamp that electrically connects the capacitors together.

9. The capacitor module according to claim 1, further comprising a booster that boosts output voltage of the capacitor.

10. The capacitor module according to claim 1, further comprising a leg made of vibration-proof rubber and attached to the heat dissipater.

* * * * *